United States Patent [19]

Baker

[11] Patent Number: 5,028,059
[45] Date of Patent: Jul. 2, 1991

[54] HINGED RESTING SEAT FOR A SLED OR CART VEHICLE

[76] Inventor: Denis L. Baker, 13449 110th Pl. NE., Kirkland, Wash. 98034

[21] Appl. No.: 532,735

[22] Filed: Jun. 4, 1990

[51] Int. Cl.$^5$ ............................................. B62B 17/06
[52] U.S. Cl. ....................................... 280/20; 280/25; 297/15; 297/195
[58] Field of Search ............... 280/18, 19.1, 20, 24, 280/25, 14.1, 845, 639, 651; 297/15, 195

[56] References Cited

U.S. PATENT DOCUMENTS

| 2,369,289 | 2/1945 | Fallon, Sr. | 297/195 |
| 3,338,589 | 8/1967 | Barton et al. | 280/25 X |
| 3,917,301 | 11/1975 | Fabris | 280/25 X |

FOREIGN PATENT DOCUMENTS

| 0359274 | 9/1922 | Fed. Rep. of Germany | 280/20 |
| 0511507 | 10/1930 | Fed. Rep. of Germany | 280/25 |
| 3414757 | 10/1985 | Fed. Rep. of Germany | 280/14.1 |
| 22865 | 11/1948 | Finland | 280/25 |
| 2611515 | 9/1988 | France | 280/14.1 |
| 54523 | 7/1923 | Switzerland | 280/14.1 |
| 1049321 | 10/1983 | U.S.S.R. | 280/20 |
| 1311987 | 5/1987 | U.S.S.R. | 280/20 |

*Primary Examiner*—Andres Kashnikow
*Assistant Examiner*—Brian L. Johnson

[57] ABSTRACT

A bicycle seat is supported on a vertical member which is supported by, and connected to, leg members that form a Y configuration. The legs of the seat mount into spring loaded hinges which anchor to the runners of a dog sled or base of a wheeled cart. The seat is pivoted in a backwards direction to a predetermined position for use. The seat is supported by way of the hinges and a rope which connect the seat device to the vehicle of choice. When use of the seat is complete, the seat will spring forward by itself, and out of the way of the operator.

2 Claims, 3 Drawing Sheets

HINGED RESTING SEAT FOR A SLED OR CART VEHICLE

BACKGROUND OF THE INVENTION

1. Field of the Invention

This invention is a resting device for use on dog sleds and wheeled carts which are pulled by one or more dogs.

2. Description of Related Art

Traveling by dog sled is very enjoyable however long distance mushing during training or competition is a physically grueling affair.

Dog sleds, unlike other modes of transportation, offer no means of seating while in motion unless the musher climbs into the basket of the sled. This method of resting offers no form of control and can prove to be quite dangerous. It is told that a few mushers have fabricated various means of resting on dog sleds however the various fabrications have not been used to any extent. Excessive weight, and the fact that an additional device will get in your way, have been listed as reasons for the lack of interest and or further development.

SUMMARY OF THE INVENTION

The principal object of this invention is to provide dog mushers with a device which can be used to rest on while in motion and, that will retract from one's way as soon as one stands up.

It is also an object of this invention to provide a device which is adjustable, and simple to use.

Further objects are to provide such a device which is very light weight, durable, will not hinder operator or vehicle movement, and is strong enough to handle continued use under severe physical and climatic conditions.

The foregoing objects can be accomplished by providing a resting device having a bicycle seat mounted onto a vertical standard which is supported by two tubular legs. In the preferred embodiment of the invention, the tubular legs are joined at the vertical standard and angled in a outward and downward fashion. The tubular legs are then bent inward at a predetermined length to a vertical position and mounted into hinges which fasten to the runners of a dog sled or the base of a wheeled cart. The tubular legs are joined to other tubular sections of the same size and material to form the basic structure of the device. Each intersection of the tubular sections are joined together by gussets. The connection between the tubular legs and the hinges is accomplished with a simple pin which extends through the tubular leg and out through the vertical sides of the hinge mechanism. A prefabricated steel spring is placed inside of the tubular leg where both ends of the spring extend through the leg in opposite directions. The pin of the hinge, slides through the eye of the spring which holds the spring in position. The spring is without tension when the body of the device is in a slightly forward yet vertical position. As the body of the device is pulled backwards away from the sled or cart to its use position, spring tension is increased, which causes the device to move forward in a rapid motion when resting is completed. The body of the device, when pulled back to its use position, is supported with a line which is looped around the vertical standard and tied to the body of the sled or cart. The height of the seat can be adjusted through the length of line used, and by raising or lowering the vertical standard which slides into the tubular body of the device. The seat can be raised or lowered in a telescopic fashion and is held in position with a pin that extends through the tubular frame and the vertical standard.

DETAILED DESCRIPTION

Figure 1:
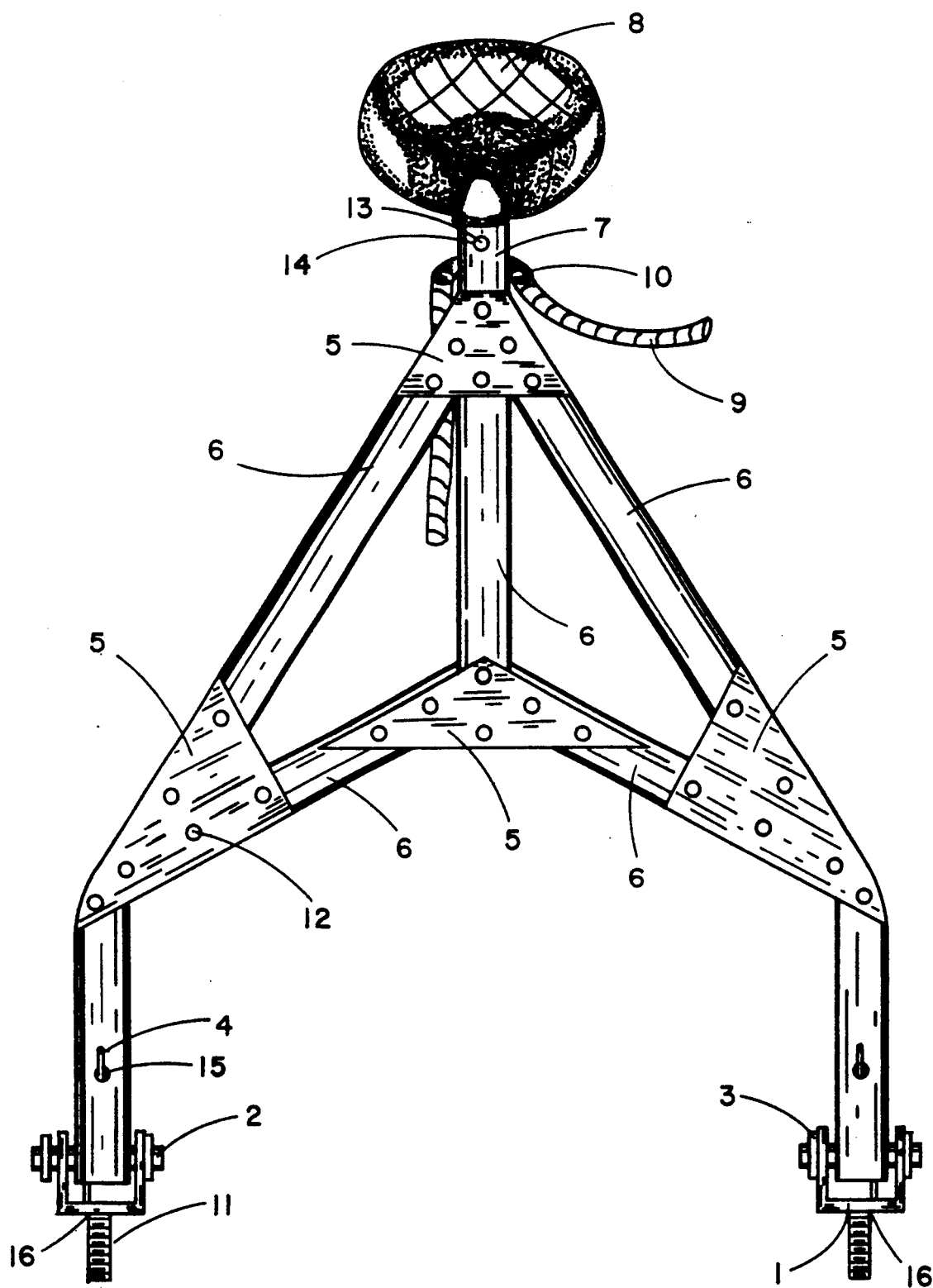
FIG. 1 is a front elevation of a resting seat device in accordance with the present invention.
Figure 2:
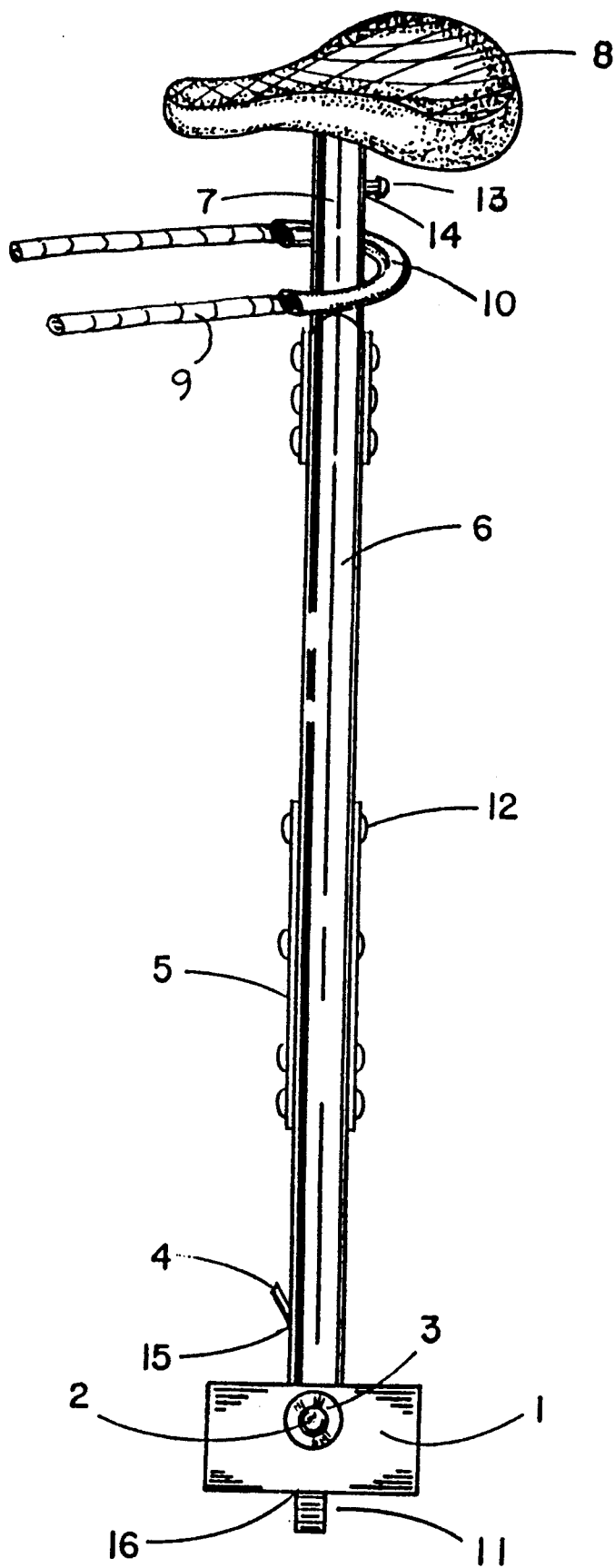
FIG. 2 is a side elevation of a resting seat device in accordance with the present invention.
Figure 4:
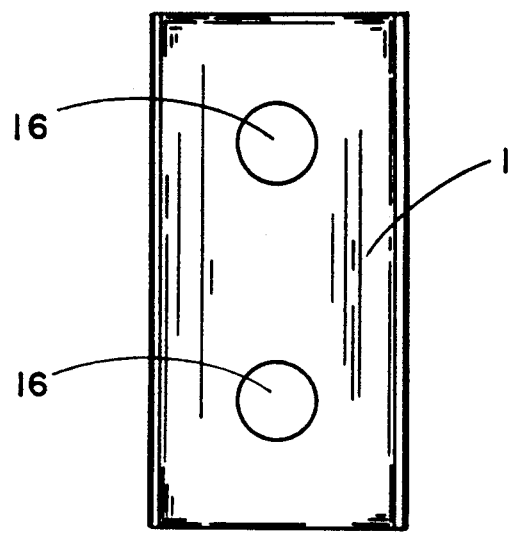
FIG. 4 is a bottom perspective of the hinge mechanism in accordance with the present invention.
Figure 3:
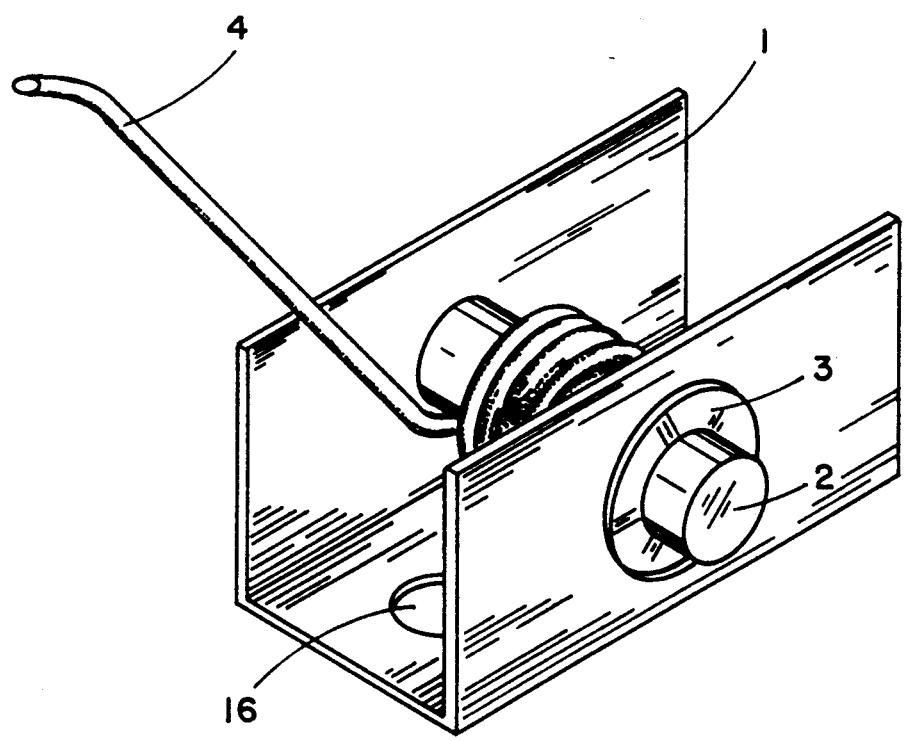
FIG. 3 is a fragmentary, side perspective of the hinge and spring mechanism of the device, with parts broken away.

The preferred resting seat device, in accordance with the present invention, includes sixteen different parts as can be seen in FIGS. 1, 2, and 3. The preferred resting seat device is primarily made of aluminum to keep the over all weight of the device as light as possible.

The hinge members 1 serve as the pivoting point for the seat device and are made of ⅛ inch aluminum channel. The inside diameter of the channel is 1" to accommodate the 1" outside diameter hollow tubular aluminum legs 6. A ⅜ inch hole is drilled through the hinges 1 and tubular legs 6 to house a ⅜ inch solid aluminum rod 2. The hinges anchor to the runners of a dog sled or the base of a wheeled cart through the use of two standard wood screws 11 by way of holes 16 drilled through the base of the hinge. The tubular legs 6 and the springs 4 are held in place by the aluminum rods 2 which in turn are held in place by ⅜ inch push nuts 3 on each side of the hinges.

The springs 4 are one of the key features of the resting seat device. The springs are made of ⅛ inch steel music wire and are made such that they cause the seat device to slap forward when released from its use position. The springs are made by wrapping the wire two full turns around a 7/16 inch bolt and the ends of the springs are bent in opposite directions as shown in FIG. 3. The bottom leg of the springs rest against the bottom of the hinge which serves as a stop. The top or upper end of the springs extend up through the inside of the tubular legs 6 and protrude out the front of the tubular legs by way of a small hole 15. The over all length of the spring is approximately 3¼ inches.

The main body of the seat device 6 is made of 0.05" by 1" O.D. hollow tubular aluminum. The body consists of two legs which are joined together with three shorter pieces of 1" O.D. tube to form a basic Y configuration. The outside or main legs of the device are bent inward approximately 6 inches from the bottom end of the legs. The angle of the bend in the legs vary and is dependent on the width of the runners on a dog sled. The vertical height of the bend is important so that the seat device does not interfere with the brake mechanism on a sled. The junction of each tubular section of the body is joined together with 0.05 inch plate aluminum gussets 5. Standard ⅛ inch rivets 12 are used to fasten the gussets to the tubular sections. The outside legs are about 25" long, the inside legs are about 10" long, and the neck or vertical section is about 14" long. The preferred resting seat device is about 34" in height.

The seat 8 consists of a standard bicycle seat. The preferred frame of the seat is made of plastic as opposed to metal and is covered with a vinyl type material. The plastic frame reduces the over all weight of the seat which is critical for proper operation of the springs 4. The seat 8 is mounted onto a section of 0.05" by ¾" O.D. hollow tubular aluminum 7. Tube 7 slides into the vertical section or neck of the main body 6 and is held in position by pin 13 which extends through a hole 14 in both tubes and consists of a simple nut and bolt arrangement. Tube 7 has several holes in it so that the seat 8 can be adjusted up or down.

The preferred rope 9 is standard ¼" nylon and is used to hold the seat device in its "use" position. The rope is placed through a 6" piece of rubber tubing 10 and together they are looped around the vertical section or neck of the seat device. The rubber tubing 10 acts as a collar for the rope and prevents wear on the rope. The ends of the rope are tied to the frame work of a dog sled or cart. The length of the rope is determined by the operator when setting the seat device to his or her comfort zone.

Under non-use conditions, minimal spring tension will exist, and the seat device will be in a slightly forward yet vertical position leaning against the body of a dog sled or wheeled cart. When the operator of the sled or cart feels a need to rest, he or she simply pulls the seat device back to its preset position and sits down. When the operator finishes resting and stands up, the seat device will spring forward allowing the operator full freedom to control the sled or cart without hinderance from the seat device.

What is claimed is:

1. A resting seat assembly adapted to be attached to dog sleds and wheeled carts comprising; a pair of spaced, vertical tubular legs, each leg having pivotally attached to a lower end thereof a hinge member, said hinge member adapted to be fixedly secured to one of a sled and cart upper surface, said lower leg end and hinge member further interconnected by a spring means to bias said seat assembly forwardly to a non-use position, said legs having an upper end rigidly interconnected by a pair of inverted, substantially V-shaped tubular sections secured to said upper leg ends by gusset means, said V-shaped tubular sections having corresponding apexes rigidly interconnected by a vertical tubular section through additional gusset means, said vertical tubular section having at an upper end thereof a seat device, and said seat device including means for telescopic adjustment within said vertical tubular section.

2. A resting seat assembly in accordance with claim 1, further including a rope attached to said seat device and adapted to be attached to said upper surface to support the seat assembly in a use position.

* * * * *